PHONOGRAPH RECORD CENTERING AND STABILIZING APPARATUS

Filed Jan. 21, 1963

INVENTOR.
WILLIAM R. CONRAD
BY
ATTORNEY

United States Patent Office 3,194,567
Patented July 13, 1965

3,194,567

PHONOGRAPH RECORD CENTERING AND STABILIZING APPARATUS

William R. Conrad, Medford Lakes, N.J., assignor to Philco Corporation, Philadelphia, Pa., a corporation of Delaware Filed Jan. 21, 1963, Ser. No. 252,639
3 Claims. (Cl. 274—10)

The present invention relates to phonograph apparatus and more particularly to apparatus for locating and stabilizing phonograph records with respect to the centering and record-supporting spindle which projects vertically from the turntable of an automatic phonograph.

In automatic phonographs of popular design, a record is manually brought over the projecting end portion of the centering spindle and lowered to engage the central apertured portion of the record onto the spindle which is constructed with a shoulder spaced downwardly from the spindle upper extremity to support records at an elevated level from which records are dropped to playing position over the turntable. The records are stabilized in their elevated position by means of a horizontal overarm adapted to lie upon the upwardly presented surface of a supported record.

With a phonograph of the above mentioned variety, difficulties are frequently encountered in effecting engagement of a record central aperture on the centering spindle of the phonograph, and it is a primary object of this invention to overcome these difficulties.

Another and more specific object of the invention has to do with the provision of improved and simplified means whereby a record, when manually brought over the projected end of the centering spindle, becomes positively located in position for alignment of the record central aperture with the upper extremity of the centering spindle so that the latter enters directly into the central aperture of the record when lowered onto the spindle.

It is also an object of the invention to provide means of the above mentioned character which is inexpensive and can readily be incorporated in an automatic phonograph without affecting its basic construction and design.

These objects and features are achieved in accordance with the invention by constructing and arranging an overarm in a novel manner so that it can function as a record locator as well as a record stabilizer. Because of this construction and ararngement, the invention makes it possible to expedite the placement of records in engagement with the record supporting and centering spindle and to effect stabilization of supported records without encumbering the phonograph with elements in excess to those customarily present thereon.

The invention as well as its objectives and characteristic features will be more fully understood from the following description based on the accompanying drawing, in which.

Figure 1:
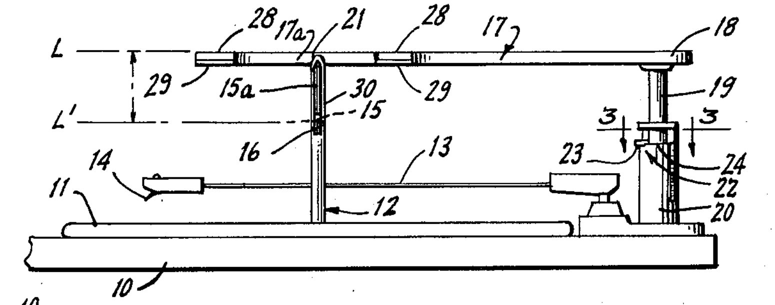
FIGURE 1 is an elevational view of phonograph apparatus incorporating a preferred embodiment of the invention.
Figure 2:
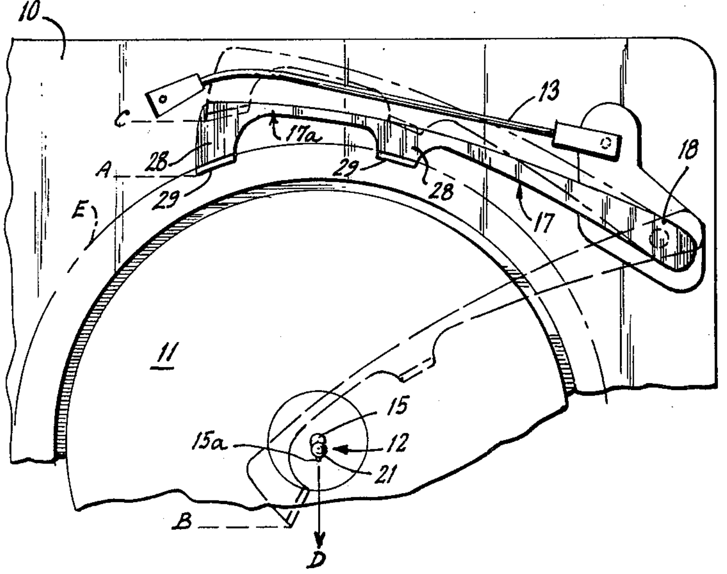
FIGURE 2 is a fragmentary top plan view of the apparatus shown in FIGURE 1.

With more particular reference to the drawing, FIGURES 1 and 2 illustrate the essential parts of a phonograph to which the invention is applied. As shown, the phonograph includes a mounting base 10 which serves to support the various parts. A turntable 11 is rotatably supported by the base and is adapted to hold the records during playing thereof. A centering spindle 12 serves to center the records and to retain them on the turntable. A tone arm 13 is arranged in conventional manner on the mounting base to swing both vertically and horizontally with respect to the turntable so that the customary pickup stylus 14 may be brought into engagement with the modulated groove of a record in playing position over the turntable.

As previously mentioned, the phonograph is of the type in which a stack of records is held in suspended position above the turntable, and the records are fed successively to the turntable. To that end the stack of records to be played is supported by means of a shoulder 15 and tapered slide member 15*a* provided on the centering spindle 12, and a record resting on the shoulder is released therefrom by means of record discharging mechanism including conventional pusher 16 movably carried by the spindle. The operation of the parts during record changing cycle is well known in the art and need no explanation here.

Also as previously mentioned, records supported on the centering spindle are stabilized by means of a member adapted to be laid upon the supported records including portions thereof which lie adjacent the spindle 12. In particular accordance with the invention, this member is constituted by an elongated generally horizontal overarm 17 which, while adapted to serve as means for stabilizing records in their elevated position, is further constructed to serve as means for locating a record with respect to the centering spindle 12 in the manner to be presently described.

The overarm 17 has an end portion 18 to which a vertical shaft 19 is connected. This shaft, as clearly seen in FIGURE 1, is received in a hollow upstanding post 20 which cooperates with the shaft to constitute means for mounting the overarm 17 on the base 10 to the side of the turntable 11 and for movement of the overarm to various operative positions. For the latter purpose the shaft 19 is adapted to slide longitudinally in the upstanding post 20 so that, as represented in FIGURE 1, the overarm 17 can be displaced vertically between an upper position L where the overarm lies at a level in substantial alignment with upper extremity 21 of the spindle 12, and a lower position L′ where the overarm lies at a level in substantial alignment with a portion of the spindle adjacent the shoulder 15 thereof. Moreover, the shaft 19 is adapted to rotate axially in the post 20 so that, as represented in FIGURE 2, the overarm 17 can be swung laterally, that is to say toward and away from the spindle 12, for selective placement in any one of positions A, B and C: position A being an intermediate position in which the overarm serves as a record locator; position B being an inner position in which the overarm serves as a record stabilizer; and position C being an outer position in which the overarm clears the records to allow for their unobstructed removal from the turntable.

Figures 3, 4:
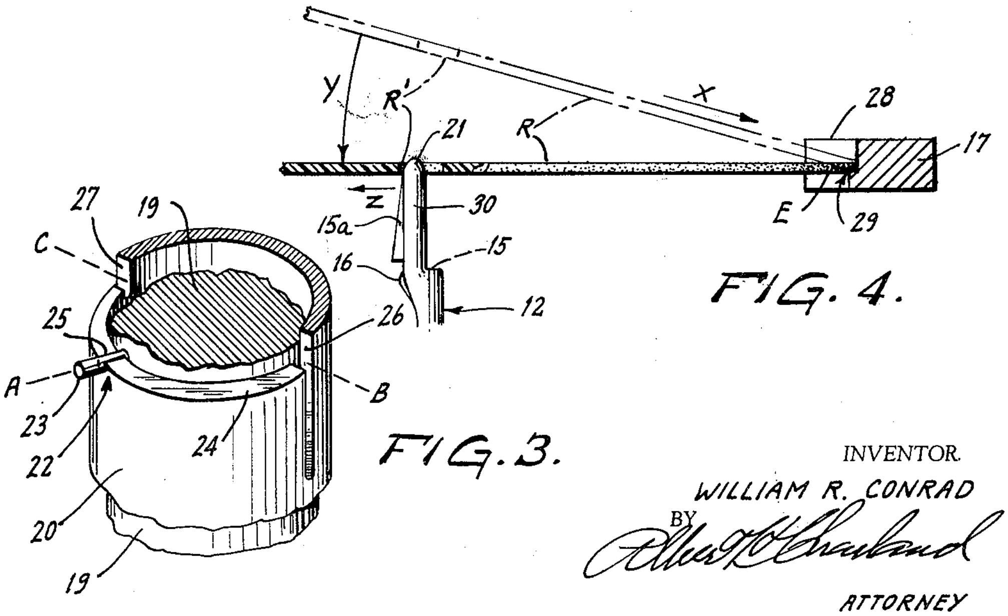
FIGURE 3 is an enlarged perspective sectional view looking in the general direction of arrows 3—3 of FIGURE 1.
FIGURE 4 is an explanatory view, partly in elevation and partly in section, illustrating the manner in which the locating-stabilizing arm establishes the position of a record for engagement with the centering spindle.

Indexing and retention of the overarm 17 in the above described various positions can readily be obtained by providing interengageable means 22 between the movable overarm shaft 19 and the stationary mounting post 20 therefore. As shown in the drawing, the means 22 consists of a rigid projection in the form of a pin 23 carried by and movable with the shaft 19 and of a ridge portion 24 which is arranged on the stationary post 20 so as to be engaged by said projection or pin. The ridge portion 24, as best seen in FIGURE 3, has a series of recesses including a first recess 25 disposed to correspond to overarm position A, a second recess 26 disposed to correspond to overarm position B, and a third recess 27 disposed to correspond to overarm position C.

Because of the above described construction, it will be understood that as the shaft 19 rotates in the post 20 in response to manual swinging of the overarm 17, the projection or pin 23 rides on the ridge portion 24 and thus can be brought into registry with any of the recesses so that the pin can seat itself within the proper recess and thus locate and hold the overarm in the desired position.

In this latter respect, it will be noted that the projection or pin 23 on the shaft 19 and the ridge portion 24 on post 20 are so disposed as to support the overarm at upper level L (FIGURE 1). Furthermore it will be noted that recess 25 corresponding to position A and recess 27 corresponding to position C are of slight depth so that when the projection or pin 23 seats itself in either of these two recesses, the overarm will not drop appreciably below said upper level, whereas the remaining or third recess 26 corresponding to position B is of greater depth so that when the aforesaid projection or pin seats itself within this third recess the overarm is free to drop from the upper level L toward the lower level L′ (FIGURE 1). Thus with the projection or pin 23 received in the deeper recess 26, the overarm is capable of bearing upon and stabilizing records on a spindle shoulder 15, and with the projection or pin received in the shallower recess 25 the overarm is capable of locating a record for its engagement with the spindle 12.

For this latter purpose, the overarm of the invention includes a portion 17*a* having abutment means which when the overarm is placed in position A provides surfaces engageable with the record to arrest it in position for direct engagement with the spindle. In the illustrated embodiment, the abutment means is constituted by leading edge portions 28 which are curved on an arc corersponding to the curvature of the peripheral edge E of the record. Since most records currently available are of the 12-inch diameter type, the curvature of the leading edge portions 28 and their position with respect to the turntable spindle when the overarm is in the aforesaid position A, are preferably such as to accommodate records of that type. However, it will be understood that the curvature of portions 28, as well as the intermediate position A of the overarm can be made to accommodate records of other diameters, for example 10-inch or 7-inch records.

The manner in which the overarm of the invention serves as a record locator will best be understood by referring to FIGURE 4. In this FIGURE 4, the overarm 17 is illustrated in position to center record R with its central apertured portion R′ in alignment with the extremity 21 of the spindle 12. In handling the record for placement on the spindle, the record is brought as represented by arrow X toward the overarm 17 until the record edge E comes into contact with the curved leading edge portions 28 (see also FIGURE 2). These portions 28 can be provided with slightly protruding shelves 29 against which the record edge abuts thus facilitating and insuring contact of the record with said portions. When the record is positively located by proper contact of the record edge with the curved portions 28, the central apertured portion R′ of the record R will be in general alignment with the spindle extremity 21 so that upon lowering the record as represented by arrow Y, spindle portion 30 above the shoulder 15 readily enters the record central aperture. As can be seen in FIGURE 4, the centering of the record is such that its central aperture while generally aligned with the spindle end portion 30, is slightly offset with respect thereto so that as the record drops to seating position on the spindle shoulder 15, the normally tapered slide member 15*a* displaces the record laterally as represented by arrow Z thus clearing the slightly protruding shelves 29 on the overarm 17. For this latter purpose it will be noted that, as represented at D, in FIGURE 2, the spindle 12 is so oriented that the slide portion 15*a* is disposed to face in a direction leading away from the curved edge portion 28 and to lie in a plane traversing the arm portion 17*a* on which said curved edge portions are provided.

It will be understood that, if desired, more than one record can be placed on the spindle in the manner stated above. It will also be understood that after the desired number of records have been so placed, the overarm 17 can be swung manually to the previously described "B" position (FIGURE 2) and thus stabilize the record or records supported on the spindle shoulder 15. When records are removed from the turntable and out of engagement with the spindle 12, the overarm is swung manually to the previously described "C" position where the overarm clears the records.

From the preceding description it will be appreciated that the overarm of the invention eliminates the need of utilizing separate and distinct members to center records for their placement in engagement with a phonograph spindle and to effect retention and stabilization of records suspended on such spindle. While a preferred embodiment has been shown and described, it will be understood that the invention is not limited to specific structures of that embodiment but embraces such changes and variations as come within the scope of the subjoined claims.

What I claim is:

1. Apparatus for centering and stabilizing a centrally apertured record in a phonograph of the type in which such records are manually brought over and lowered to engage a vertically extended spindle having a record-supporting shoulder spaced downwardly from the spindle upper extremity, said apparatus comprising; an elongated generally horizontal arm having portions constituting abutment means for contact with the peripheral edge of a record; a generally vertical shaft connected at its upper end portion to one end portion of the arm; a hollow upstanding post in which the shaft is received to slide upwardly and downwardly for selective placement of the arm either at a level in substantial alignment with the spindle extremity or at a level at substantial alignment with the spindle shoulder, the shaft being also received in the post to rotate therein for selective placement of the arm in a predetermined intermediate position in which the mentioned abutment means contact the peripheral edge of the record to center the same when brought over the upper extremity of the spindle, or in a predetermined inner position in which the arm rests upon the upwardly presented face of the record to stabilize the same when in engagement with the spindle and supported by the shoulder thereof, or a predetermined outer position in which the arm and mentioned abutment means clear records for removal from the spindle; and interengageable means between the shaft and post to index and retain the arm in its several positions.

2. Apparatus as set forth in claim 1, in which the mentioned portions constituting the abutment means are curved on an arc corresponding to the curvature of the peripheral edge of the record.

3. Apparatus as set forth in claim 1, in which the interengageable means consists of a laterally projecting pin rigid and movable with the shaft and a ridge portion arranged on the post and engaged by the pin, said ridge portion having a series of recesses including a first recess located to establish the mentioned intermediate position of the arm, a second recess located to establish the mentioned inner position of the arm and a third recess located to establish the mentioned outer position of the arm.

References Cited by the Examiner

UNITED STATES PATENTS

| | | | |
|---|---|---|---|
| 1,349,611 | 8/20 | Host | 274—1 |
| 1,455,355 | 5/23 | Reinhold | 274—1 |
| 2,062,396 | 12/36 | Carson | 274—10 |
| 2,831,693 | 4/58 | Zahner | 274—10 |
| 2,989,312 | 6/61 | Vistain | 274—10 |

FOREIGN PATENTS

| | | |
|---|---|---|
| 80,035 | 10/55 | Denmark. |
| 903,036 | 2/54 | Germany. |
| 351,461 | 6/31 | Great Britain. |
| 729,018 | 4/55 | Great Britain. |

NORTON ANSHER, *Primary Examiner.*